(12) United States Patent
Headrick et al.

(10) Patent No.: US 6,535,889 B1
(45) Date of Patent: *Mar. 18, 2003

(54) SYSTEM AND METHOD FOR OBTAINING AND DISPLAYING AN INTERACTIVE ELECTRONIC REPRESENTATION OF A CONVENTIONAL STATIC MEDIA OBJECT

(75) Inventors: Garland Todd Headrick, Duluth, GA (US); Kristopher Derek Hutchinson, Atlanta, GA (US); Robert Bruno Mignone, Atlanta, GA (US); James Edwin Harris, III, Atlanta, GA (US); Peeter Todd Mannik, 3098 Oak Chase Dr., Roswell, GA (US) 30075; Stephen Andrew Hyser, Roswell, GA (US)

(73) Assignee: Peeter Todd Mannik, Roswell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/468,687

(22) Filed: Dec. 20, 1999

Related U.S. Application Data

(63) Continuation-in-part of application No. 09/406,171, filed on Sep. 23, 1999.

(51) Int. Cl.⁷ .............................................. G06F 17/30
(52) U.S. Cl. ........................ 707/104.1; 705/10; 705/14; 705/26; 705/37; 709/218; 345/684; 345/349
(58) Field of Search ........................... 709/218; 705/26, 705/14, 37, 10; 345/349, 684; 707/104.1

(56) References Cited

U.S. PATENT DOCUMENTS

| | | |
|---|---|---|
| 5,251,129 A | 10/1993 | Jacobs et al. |
| 5,321,841 A | 6/1994 | East et al. |
| 5,572,643 A | 11/1996 | Judson |
| 5,737,619 A | 4/1998 | Judson |

(List continued on next page.)

OTHER PUBLICATIONS

Gallagher K, et al., A framework for targeting banner advertising on the Internet, System Sciences, 1997, Proceedings of the Thirtieth Hwaii International Conference on, Jan. 7–10, 1997, pp. 265–274.

(List continued on next page.)

*Primary Examiner*—Charles Rones
(74) *Attorney, Agent, or Firm*—Geoff L. Sutcliffe; Kilpatrick Stockton LLP

(57) ABSTRACT

A system and method for displaying an interactive electronic representation ("IER") of a conventional static media object, such as an electronic publication containing a digital image, is provided by associating a unique identification tag with a static media object. The unique identification tag is also associated with the IER, which is stored in a computer database. An application program for retrieving the IER embodying aspects of the present invention may receive the unique identification tag and, based upon the unique identification tag, locate and display the corresponding IER. A user of the application program may then interact with the IER by selecting portions of the IER. When a portion of the IER is selected, additional information regarding the selected portion of the IER may be displayed to the user.

16 Claims, 9 Drawing Sheets

U.S. PATENT DOCUMENTS

| | | | | |
|---|---|---|---|---|
| 5,890,135 | A | * 3/1999 | Powell | 705/14 |
| 5,897,639 | A | 4/1999 | Greef et al. | |
| 5,938,727 | A | * 8/1999 | Ikeda | 709/218 |
| 5,963,915 | A | * 10/1999 | Kirsch | 705/26 |
| 5,963,964 | A | 10/1999 | Nielsen | 707/501.1 |
| 5,966,135 | A | 10/1999 | Roy et al. | |
| 5,970,471 | A | * 10/1999 | Hill | 705/26 |
| 5,987,256 | A | 11/1999 | Wu et al. | |
| 5,991,781 | A | 11/1999 | Nielsen | |
| 6,009,410 | A | 12/1999 | LeMole et al. | |
| 6,009,413 | A | 12/1999 | Webber et al. | 705/26 |
| 6,035,330 | A | * 3/2000 | Astiz et al. | 709/218 |
| 6,037,934 | A | 3/2000 | Himmel et al. | 345/760 |
| 6,038,598 | A | 3/2000 | Danneels | |
| 6,041,360 | A | 3/2000 | Himmel et al. | 709/245 |
| 6,076,091 | A | 6/2000 | Fohn et al. | |
| 6,091,956 | A | 7/2000 | Hollenberg | |
| 6,097,441 | A | 8/2000 | Allport | |
| 6,105,044 | A | 8/2000 | DeRose et al. | |
| 6,115,649 | A | * 9/2000 | Sakata | 700/241 |
| 6,141,010 | A | 10/2000 | Hoyle | |
| 6,154,205 | A | * 11/2000 | Carroll et al. | 345/684 |
| 6,211,871 | B1 | 4/2001 | Himmel et al. | |
| 6,211,878 | B1 | 4/2001 | Cheng et al. | |
| 6,262,724 | B1 | 7/2001 | Crow et al. | |
| 6,271,840 | B1 | * 8/2001 | Finseth et al. | 345/349 |
| 6,272,672 | B1 | 8/2001 | Conway | |
| 2001/0027409 | A1 | 10/2001 | Sasaki et al. | |
| 2002/0026353 | A1 | 2/2002 | Porat et al. | |
| 2002/0035536 | A1 | 3/2002 | Gellman | |

OTHER PUBLICATIONS

Chang A. M. et al., "Goodies" in exchange for consumer information on the Internet: the economics and issues, System Sciences, 1998, Proceedings of the Thirty–First Hawaii International Converence on, Jan. 6–9, 1998, pp. 533–542.

Search Report issued in PCT/US00/26072, mailed Jan. 12, 2001.

iMedium, "The New Way to See! Commerce™"—Company Overview—9 pages (Feb. 2000).

Clique "Turning Readers into Buyers™"—4 pages (Mar. 01, 2000).

Amazon.com, "About Amazon.com"—3 pages (May 11, 2000).

AsSeenin.com—1 page (May 11, 2000).

Neo–Media.com—4 pages (May 11, 2000) (German).

* cited by examiner

SYSTEM AND METHOD FOR OBTAINING AND DISPLAYING AN INTERACTIVE ELECTRONIC REPRESENTATION OF A CONVENTIONAL STATIC MEDIA OBJECT

CROSS REFERENCE TO RELATED APPLICATIONS

This application is a continuation-in-part application and claims the benefit of priority under 35 U.S.C. §120 to copending U.S. application Ser. No. 09/406,171, filed on Sep. 23, 1999, the entire contents of which are incorporated by reference.

TECHNICAL FIELD

The present invention relates to computer systems for displaying interactive electronic documents. More particularly, the present invention relates to computer systems for displaying interactive electronic representations associated with static media objects.

BACKGROUND OF THE INVENTION

Although the Internet has quickly become a popular source for information, entertainment, and commerce, traditional static media that includes physical publications, like magazines and newspapers, continues to enjoy popularity among readers. Due to the low cost and superior portability of traditional static media, it is likely to continue to thrive as a source of information, entertainment, and commerce into and throughout the Information Age.

Despite the continued popularity of traditional static media, the limitations of the medium become apparent when compared to today's Internet-based information sources, like the world-wide-web ("WWW" or "web"). For example, traditional static media may take much longer to produce than electronically-available content, and may be considerably more expensive to produce due to printing costs. Moreover, traditional static media typically cannot provide the depth of content permitted by electronic publications. Because traditional static media cannot be associated with, or "hot-linked" to, additional sources of information like electronic publications can, traditional static media cannot provide the virtually infinite depth of content provided by electronic publications.

This severe limitation on the depth of content provided by traditional static media can be very frustrating for readers and, in particular, shoppers. For example, an article about a celebrity in a traditional print-based magazine or physical publication may show one or more photographs of the celebrity. A reader of the magazine that enjoys the article and wants to learn more about the celebrity may perform a web search for additional information about the celebrity. But, what if the reader desires additional information regarding a parka the celebrity is wearing in one of the magazine photographs? The reader may turn to a web search engine for assistance, but without knowing the manufacturer of the parka or other information, any Internet search by the reader is likely to be futile. Even if the reader knows the name of the manufacturer of the parka, the reader may be unable to locate the manufacturer's web site, and may be unable to determine if the manufacturer has a web site at all. Similarly, the reader may be unable to obtain information regarding furniture or other objects shown in the photographs with the article. This inability to locate additional information about objects shown in traditional static media publications can be extremely frustrating for a reader.

As another example of how the limitations of traditional static media may be frustrating to readers, consider the reader of a traditional print-based skiing magazine (also referred to as a physical publication). An article in a skiing magazine may feature pictures of a skier on a beautifully groomed slope with a quaint ski lodge in the background. However, in most cases, all of the objects in the photographs will not be identified. Therefore, the reader may have a great degree of difficulty locating the ski resort, the type of ski bindings worn by the skier, or even the exact slope that the skier is on. This inability to locate information related to traditional static media publications is extremely frustrating for consuming readers.

Similar to traditional static media, conventional static media present in some electronic publications on the Internet, typically do not provide any detailed information about products shown in digital or electronic images within the electronic publication. While such digital or electronic images may be "hot-linked" to corresponding Internet sites, such static media do not provide a break down of products forming the digital or electronic image contained within the electronic publication. Conventional electronic publications generally do not provide instantaneous product descriptions and separate enlarged views of each of the products shown within the image. For example, an electronic publication, such as a web page, may provide a graphics image of a skiing scene similar to the one discussed above that shows a skier on a beautifully groomed slope with a quaint ski lodge in the background. If the reader wants more information about the individual objects depicted in the skiing scene, such as an enlarged view of the skis or a complete description as to their identification and possible retail location or both, the reader may need to initiate an internet or web search to ascertain this type of product or service information. Such an internet search could be rather time consuming without any guarantee of success.

Therefore, in light of these problems, there is a need for a system and method for displaying an interactive electronic representation of a corresponding static media object that can easily associate a traditional static media object, such as a magazine page, or conventional static media objects, such as digital or electronic images contained within conventional electronic publications, to an interactive electronic representation of a static media object. There is a further need for a system and method for displaying an interactive electronic representation of a corresponding traditional static media object that can "hot-link" objects in printed publications to related electronic documents. There is an additional need for a system and method for displaying an interactive electronic representation of a corresponding static media object that can track demographic information regarding consumers of traditional static media objects, such as magazines and newspapers, and conventional static media objects, such as electronic publications containing digital images.

SUMMARY OF THE INVENTION

The present invention solves the problems described above by providing a method and system for displaying an interactive electronic representation of a static media object (an "IER"), such as a page in a magazine, newspaper, a digital image contained within an electronic publication, etc., that associates a static media object with a unique identifier. The present invention advantageously allows a consumer of the static media object (i.e. the reader of the magazine, newspaper, or electronic publication) to utilize the unique identifier to easily access the corresponding IER. The present invention also allows the consumer to quickly locate additional information regarding aspects of the static media object by interacting with the IER using a computing device, like a personal computer or personal digital assistant.

Generally described, the present invention permits access to an IER by associating a unique identification tag with a static media object. The unique identification tag is also associated with the IER, which is stored in a computer database. In this manner, an application program for retrieving the IER embodying aspects of the present invention may receive the unique identification tag and, based upon the unique identification tag, locate and display the corresponding IER. A user of the application program may then interact with the IER by selecting a portion of the IER. When a portion of the IER is selected, additional information regarding the selected portion of the IER may be displayed to the user.

More specifically described, the present invention associates a static media object with a unique identification tag. For traditional static media objects, the unique identification tag may be printed or otherwise displayed on or adjacent to the static media object, preferably in a conspicuous location. For conventional static media objects, such as electronic publications containing digital images, a static media object in the form of a digital image may automatically pass a hidden unique identification tag to the application program when the user "clicks on" or activates the static media object. Alternatively, the unique identification tag may be displayed adjacent to the static media object.

The unique identification tag is associated with an IER corresponding to the static media object in a relational database such that the appropriate IER corresponding to the static media object is displayed when the unique identification tag is received by the application program. Portions of the IER may be "hot-linked" to other electronic documents, web sites, or other IERs.

The present invention also provides an application program that may be utilized to display and permit interaction with IERs corresponding to static media objects. According to an aspect of the present invention, a user may utilize a computing device equipped with a standard web browser to visit a web site embodying the application program. The user may provide a unique identification tag corresponding to a static media object at the web site or the web site can receive the unique identification tag from a digital image of an electronic publication which may be "hot-linked" to the web site containing the application program. The application program may then locate the IER corresponding to the static media object based upon the provided unique identification tag. Once the IER has been located, the IER is transmitted to the web browser for display to the user.

Once the IER has been displayed to the user, the user may interact with the IER by selecting a portion of the IER. In response to the selection of a portion of the IER, additional information regarding the selected portion of the IER may be displayed. For instance, if the IER contains a photograph of a skier on a snowy mountain slope, selecting the portion of the IER containing the skier may display additional information regarding the skier's identity, equipment, or location. Additionally, the user may be permitted to purchase items shown in portions of the IER on-line, or may be provided directions to a brick-and-mortar retailer that sells the item. The user's interaction with the IER may be monitored, and detailed demographic information about the user may be compiled. The demographic information may be then provided to the supplier of the IER, such as a manufacturer, ad agency, or publisher.

According to another embodiment of the present invention, a user without the aid of a computing device may access an interactive electronic representation of a corresponding media object via a voice network. The user of the voice system may use a telephone to dial into a system for interacting with an interactive electronic representation of the static media object. The user may provide a unique identification tag corresponding to a static media object using dual-tone multi-frequency (DTMF) codes. In response to receiving the unique identification tag, the voice system may transmit an interactive aural representation of the static media object to the user. The user may then select portions of the aural interactive electronic representation of the static media object using additional DTMF codes. Additional information regarding the selected portion of the IER may be transmitted to the user via the telephone network.

In this manner, the present invention advantageously provides a system and method for displaying an interactive electronic representation of a corresponding static media object. That the present invention improves over the drawbacks of the prior art and accomplishes the objects of the invention will become apparent from the detailed description of the illustrative embodiments to follow.

DETAILED DESCRIPTION

Figure 1:
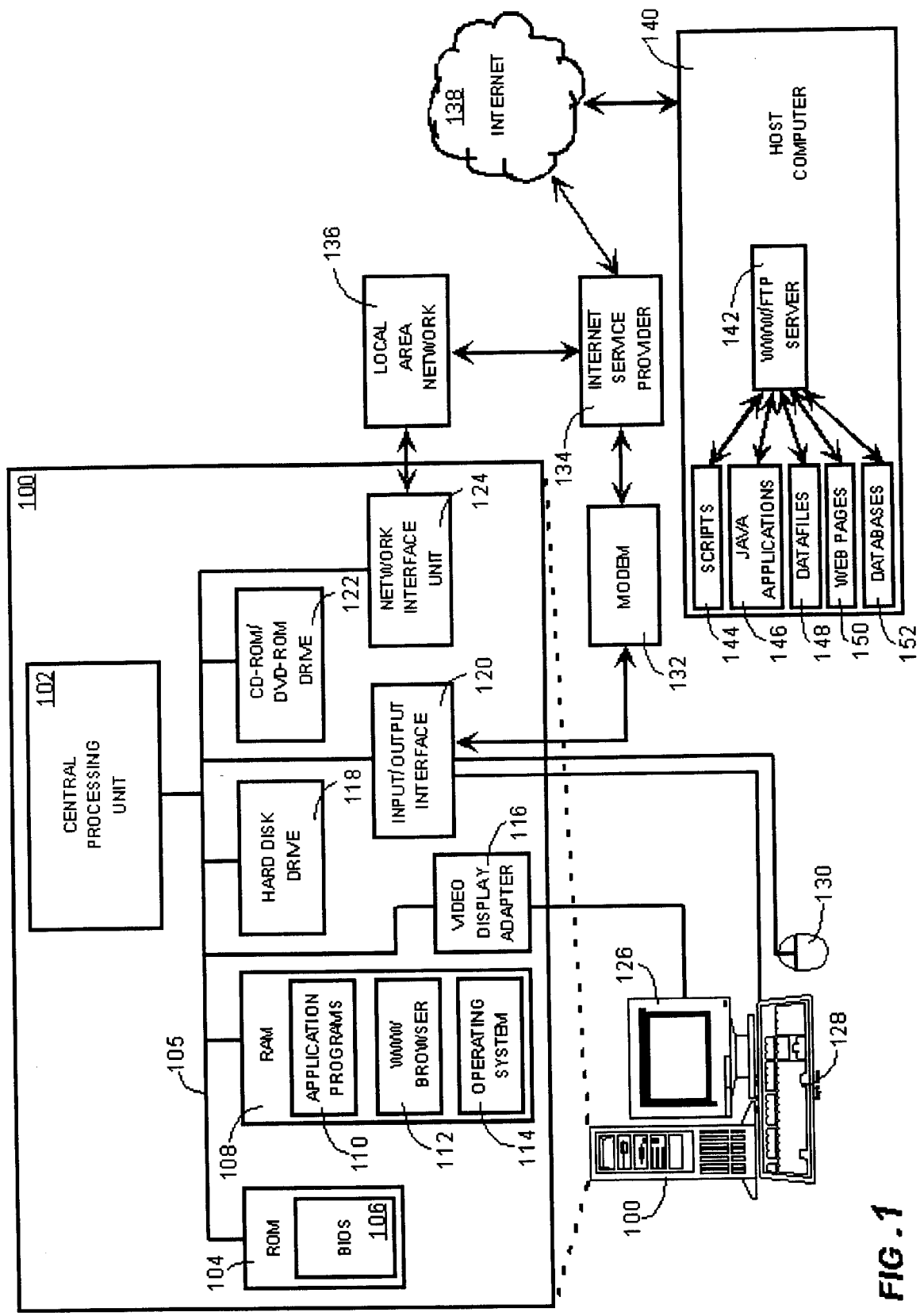
FIG. 1 is a block diagram of a networked personal computer that provides the operating environment for embodiments of the present invention.

The present invention is directed toward a system and method for displaying an interactive electronic representation of a corresponding static media object. The present invention may be embodied in an application program or in another type of program module. In an illustrative embodiment, the present invention is embodied in an application program running on a personal computer for displaying an interactive electronic representation of a corresponding static media object.

Illustrative Operating Environment

Although the illustrative embodiment will be generally described in the context of an application program running on a personal computer, those skilled in the art will recognize that the present invention may be implemented in conjunction with operating system programs or with other types of program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a standalone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard wired logic or programs stored in nonvolatile memory, such as read-only memory.

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. Referring now to FIG. 1, an illustrative environment for implementing the invention includes a conventional personal computer 100, including a processing unit 102, a system memory, including read only memory (ROM) 104 and random access memory (RAM) 108, and a system bus 105 that couples the system memory to the processing unit 102. The read only memory (ROM) 104 includes a basic input/output system 106 (BIOS), containing the basic routines that help to transfer information between elements within the personal computer 100, such as during start-up. The personal computer 100 further includes a hard disk drive 118 and an optical disk drive 122, e.g., for reading a CD-ROM disk or DVD disk, or to read from or write to other optical media. The drives and their associated computer-readable media provide nonvolatile storage for the personal computer 100. Although the description of computer-readable media above refers to a hard disk, a removable magnetic disk and a CD-ROM or DVD-ROM disk, it should be appreciated by those skilled in the art that other types of media are readable by a computer, such as magnetic cassettes, flash memory cards, digital video disks, Bernoulli cartridges, and the like, may also be used in the illustrative operating environment.

A number of program modules may be stored in the drives and RAM 108, including an operating system 114 and one or more application programs 110, such as a program for browsing the world-wide-web, such as WWW browser 112. Such program modules may be stored on hard disk drive 118 and loaded into RAM 108 either partially or fully for execution.

A user may enter commands and information into the personal computer 100 through a keyboard 128 and pointing device, such as a mouse 130. Other control input devices (not shown) may include a microphone, joystick, game pad, satellite dish, scanner, or the like. These and other input devices are often connected to the processing unit 100 through an input/output interface 120 that is coupled to the system bus, but may be connected by other interfaces, such as a game port, universal serial bus, or firewire port. A display monitor 126 or other type of display device is also connected to the system bus 105 via an interface, such as a video display adapter 116. In addition to the monitor, personal computers typically include other peripheral output devices (not shown), such as speakers or printers. The personal computer 100 may be capable of displaying a graphical user interface on monitor 126.

The personal computer 100 may operate in a networked environment using logical connections to one or more remote computers, such as a host computer 140. The host computer 140 may be a server, a router, a peer device or other common network node, and typically includes many or all of the elements described relative to the personal computer 100. The LAN 136 may be further connected to an internet service provider 134 ("ISP") for access to the Internet 138. In this manner, WWW browser 112 may connect to host computer 140 through LAN 136, ISP 134, and the Internet 138. Such networking environments are commonplace in offices, enterprise-wide computer networks, intranets and the Internet.

When used in a LAN networking environment, the personal computer 100 is connected to the LAN 136 through a network interface unit 124. When used in a WAN networking environment, the personal computer 100 typically includes a modem 132 or other means for establishing communications through the internet service provider 134 to the Internet. The modem 132, which may be internal or external, is connected to the system bus 105 via the input/output interface 120. It will be appreciated that the network connections shown are illustrative and other means of establishing a communications link between the computers may be used.

The operating system 114 generally controls the operation of the previously discussed personal computer 100, including input/output operations. In the illustrative operating environment, the invention is used in conjunction with Microsoft Corporation's "Windows 98" operating system and a WWW browser 112, such as Microsoft Corporation's Internet Explorer or Netscape Corporation's Internet Navigator, operating under this operating system. However, it should be understood that the invention can be implemented for use in other operating systems, such as Microsoft Corporation's "WINDOWS 3.1," "WINDOWS 95", "WINDOWS NT" and "WINDOWS 2000" operating systems, IBM Corporation's "OS/2" operating system, SunSoft's "SOLARIS" operating system used in workstations manufactured by Sun Microsystems, and the operating systems used in "MACINTOSH" computers manufactured by Apple Computer, Inc. Likewise, the invention may be implemented for use with other WWW browsers known to those skilled in the art.

Host computer 140 is also connected to the Internet 138, and may contain components similar to those contained in personal computer 100 described above. Additionally, host computer 140 may execute an application program for receiving requests for WWW pages, and for serving such pages to the requestor, such as WWW server 142. According to an embodiment of the present invention, WWW server 142 may receive requests for WWW pages 150 or other documents from WWW browser 112. In response to these requests, WWW server 142 may transmit WWW pages 150 comprising hyper-text markup language ("HTML") or other markup language files, such as active server pages, to WWW browser 112. Likewise, WWW server 142 may also transmit requested data files 148, such as graphical images or text information, to WWW browser 112. WWW server may also execute scripts 144, such as CGI or PERL scripts, to dynamically produce WWW pages 150 for transmission to WWW browser 112. WWW server 142 may also transmit scripts 144, such as a script written in JavaScript, to WWW browser 112 for execution. Similarly, WWW server 142 may transmit programs written in the Java programming language, developed by Sun Microsystems, Inc., to WWW browser 112 for execution. As will be described in more detail below, aspects of the present invention may be embodied in application programs executed by host computer 142, such as scripts 144, or may be embodied in application programs executed by computer 100, such as Java applications 146. Those skilled in the art will also appreciate that aspects of the invention may also be embodied in a stand-alone application program.

Brief Explanation of Terms

The term "static media" includes both traditional and conventional publications. The term "traditional static media" encompasses physical publications such as magazines, newspapers, pamphlets, and other similar physical publications that do not provide any interactive information for the reader. The term "traditional static media object" includes parts or portions of physical publications, such as a photograph or illustration or page of text or any combination thereof that may depict goods or services for sale or any other type of information. The term "conventional static media" includes any electronic publication such as web pages on the Internet, publications available on CD-ROM, digital images, and other like electronic publications. The term "conventional static media object" comprises parts or portions of electronic publications, such as digital graphic image or screen of text or both or any combination thereof that may depict goods or services for sale or any other type of information. The reader will appreciate that these definitions are intended to be illustrative rather than exhaustive. Other possible embodiments encompassed by these terms will become more apparent from the detailed description of the illustrative embodiments of the present of invention as discussed hereinbelow.

Illustrative Embodiments of The Present Invention

Figure 2:
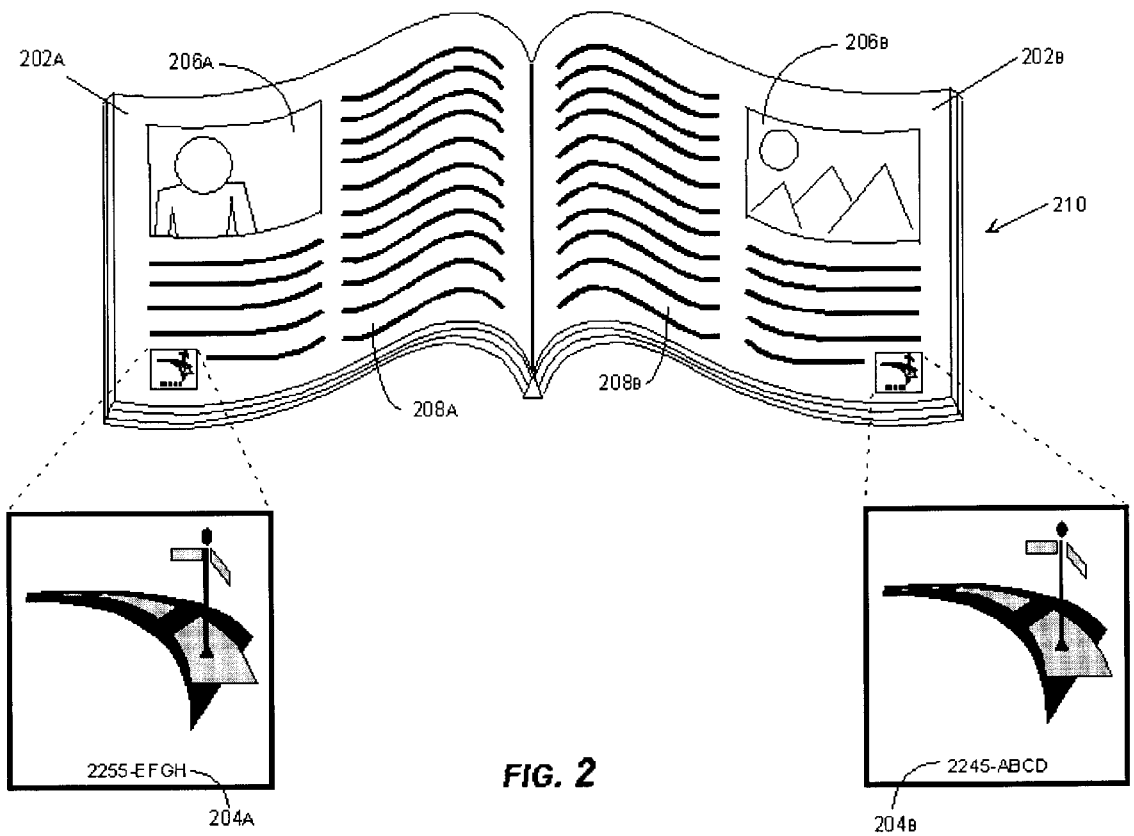
FIG. 2 illustrates a static media object that has been associated with a unique identifier.
Figure 3A:
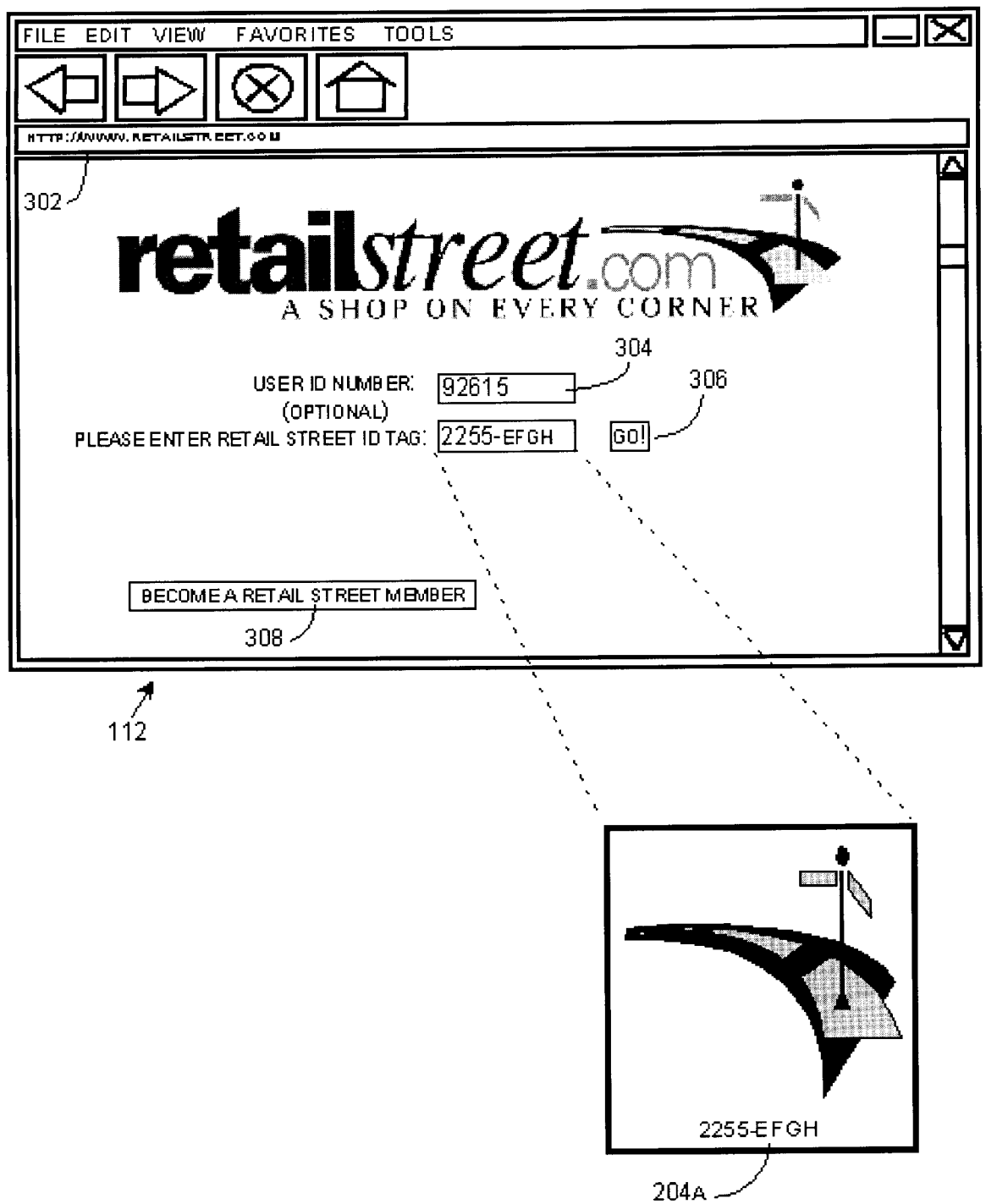
FIGS. 3A and 3B are display screens of a software application program for displaying an interactive electronic representation of a corresponding traditional static media object that embodies aspects of the present invention.
Figure 3B:
Figure 3C:
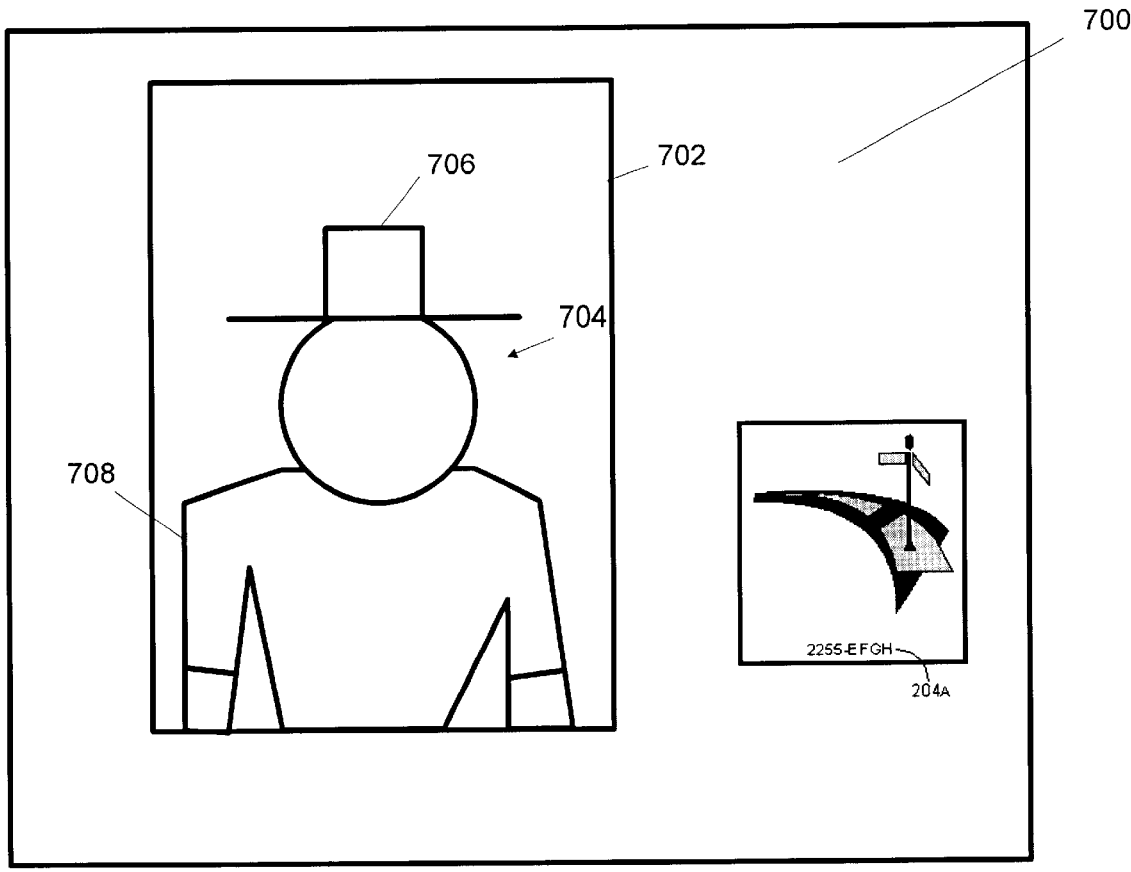
FIG. 3C is a display screen of a conventional static media object in the form a digital graphic image contained within a portion of an electronic publication which has a unique identification tag displayed adjacent to a digital image.
Figure 3D:
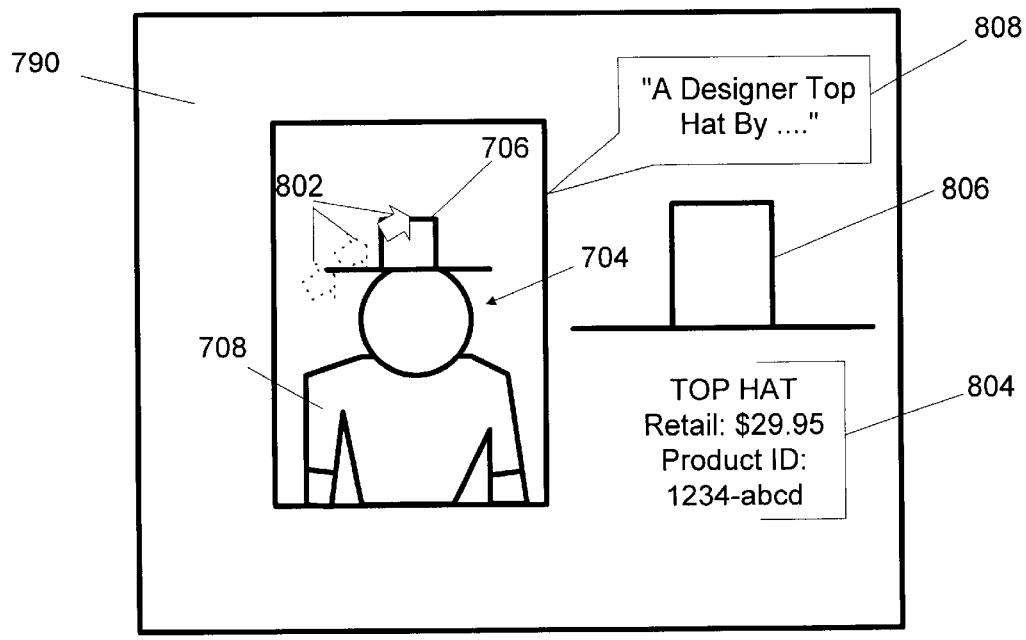
FIG. 3D is a display screen of a software application program for displaying an interactive electronic representation of the corresponding conventional static media object of FIG. 3C that embodies aspects of the present invention.
Figure 3E:
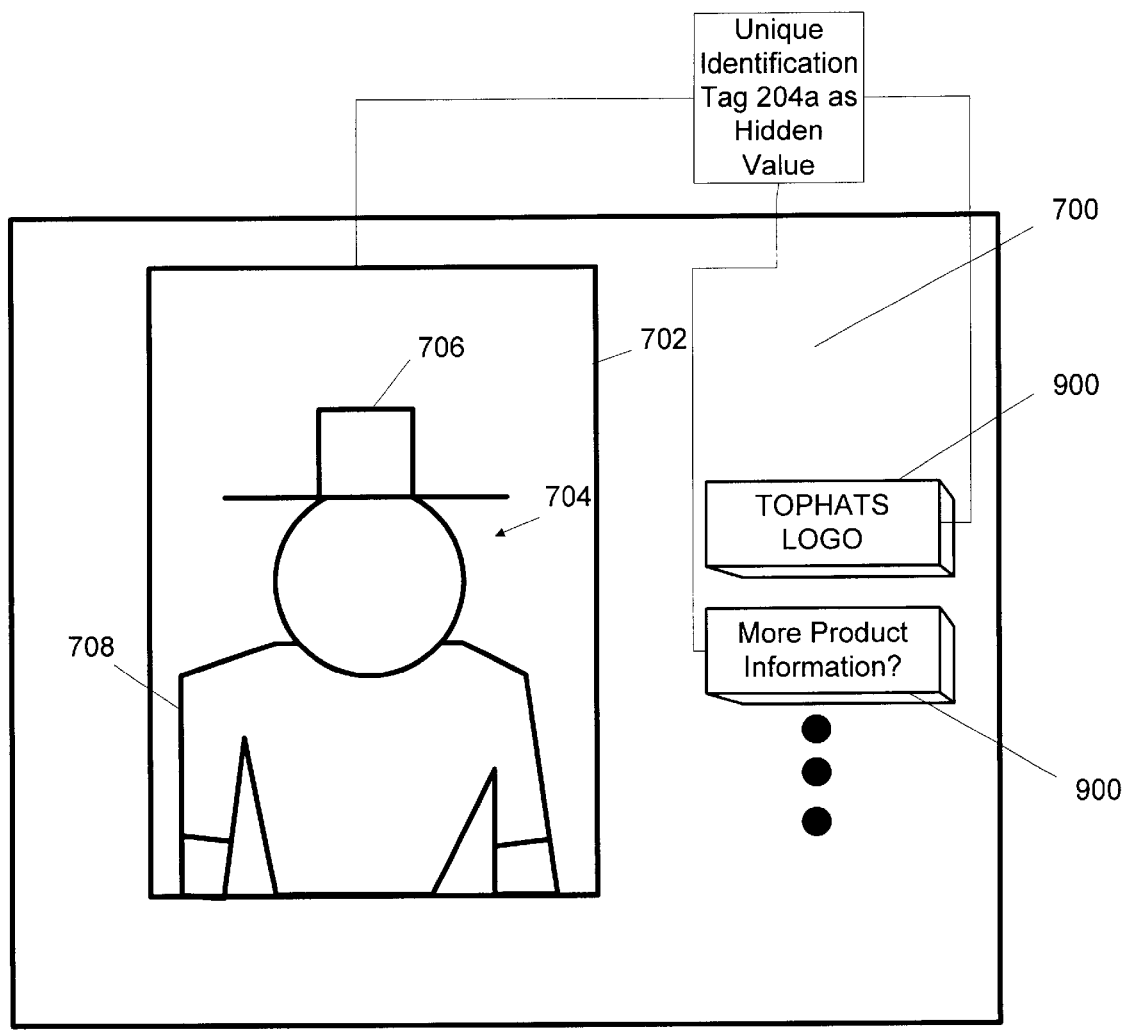
FIG. 3E is a display screen of a conventional static media object in the form a digital graphic image contained within a portion of an electronic publication which has a hidden unique identification tag.
Figure 4:
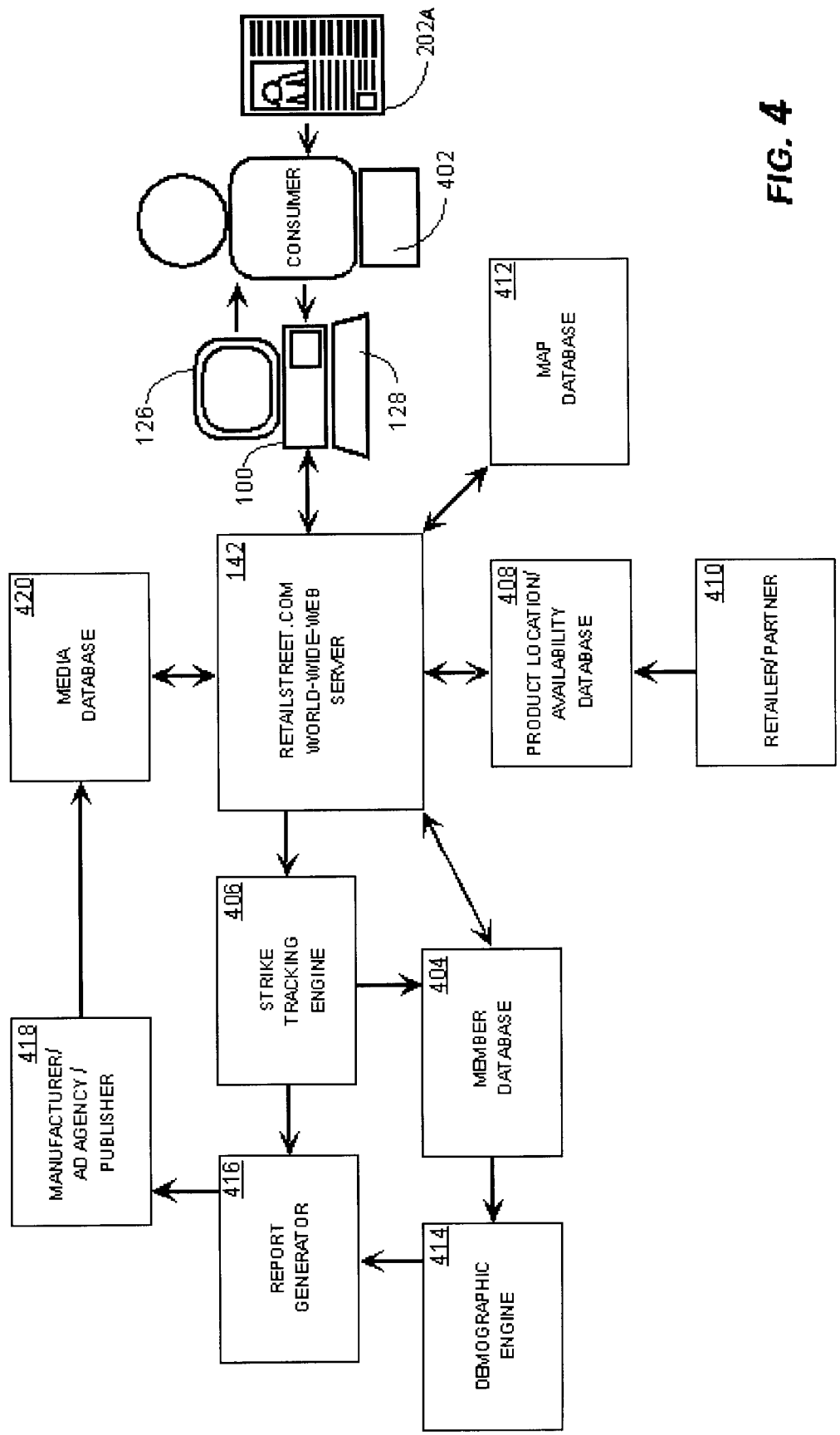
FIG. 4 is a block diagram of a distributed computer system for implementing aspects of the present invention.
Figure 5:
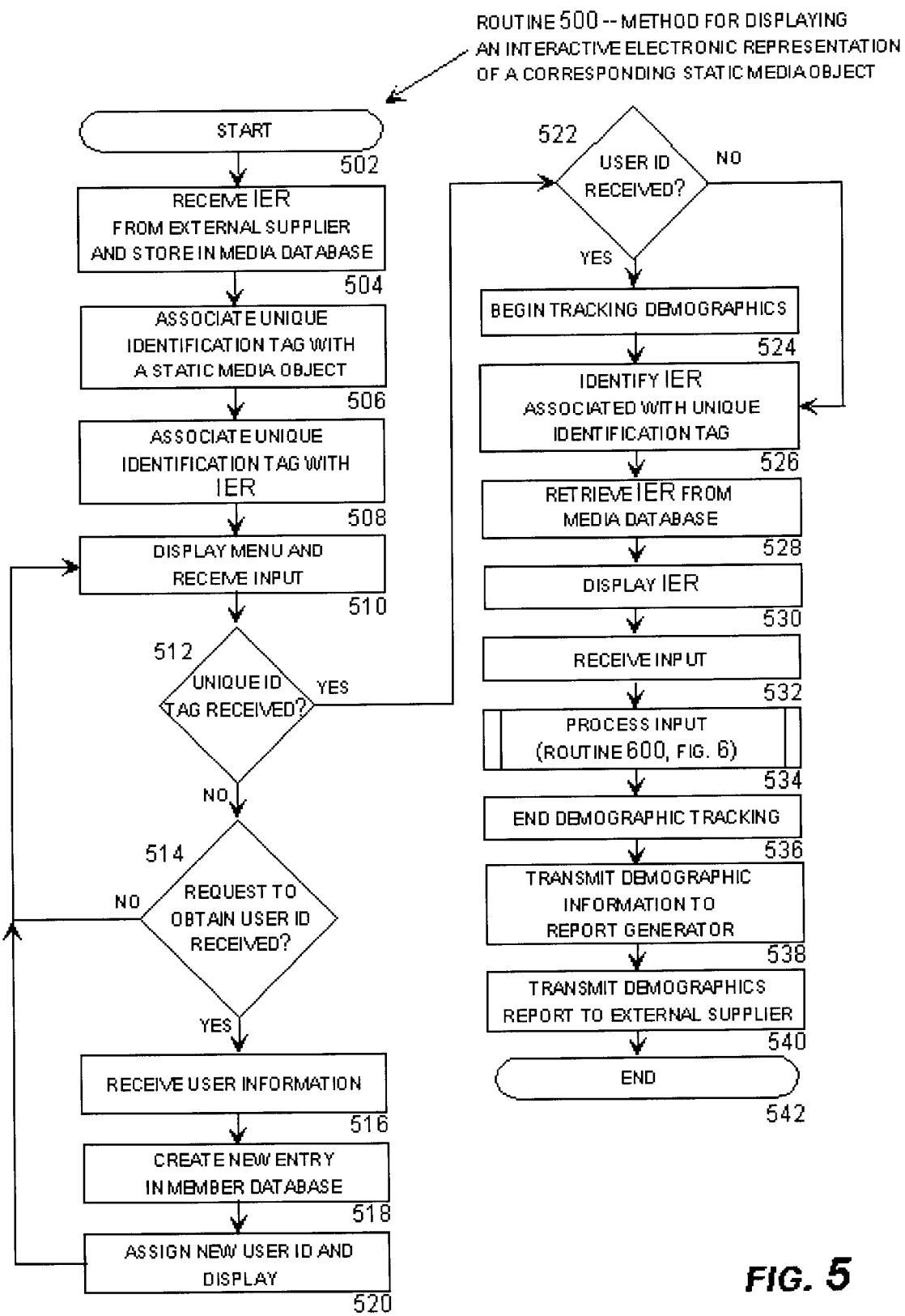
FIG. 5 is a flow diagram illustrating a method for displaying an interactive electronic representation of a corresponding static media object.
Figure 6:
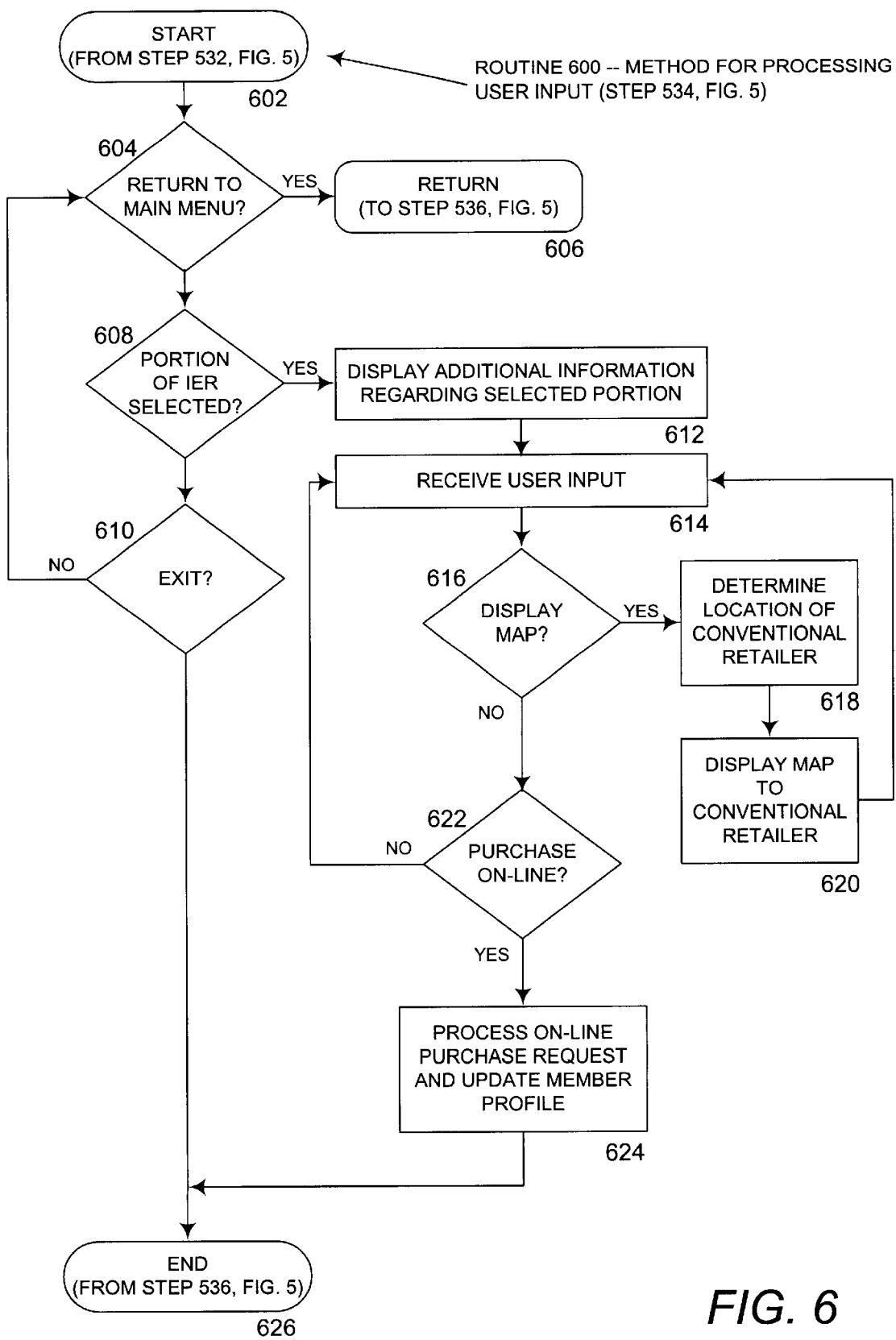
FIG. 6 is a flow diagram illustrating a method for receiving and handling user input selecting portions of a displayed interactive electronic representation of a corresponding static media object.

With the above preface on the illustrative operating environment for embodiments of the present invention, the remaining FIGS. 2–6 which illustrate aspects of several embodiments of the present invention will be described. FIG. 2 illustrates a traditional static media object that has been associated with a unique identifier. FIGS. 3a and 3b are display screens of a software application program for displaying an interactive electronic representation of a corresponding traditional static media object that embodies aspects of the present invention. FIG. 3c is a display screen of a software application program that displays an electronic representation of a conventional static media object, such as a digital image contained within an electronic publication. FIG. 3d is a display screen of a software application program for displaying an interactive electronic representation of the corresponding conventional static media object of FIG. 3c that embodies aspects of the present invention. FIG. 4 is a block diagram of a distributed computer system that embodies aspects of the present invention. FIG. 5 is a flow diagram illustrating a method for displaying an interactive electronic representation of a corresponding static media object. FIG. 6 is a flow diagram illustrating a method for receiving and handling user input selecting portions of a displayed interactive electronic representation of a corresponding static media object.

Referring now to FIG. 2, aspects of the present invention will be described. FIG. 2 illustrates two traditional static media objects that have been associated with unique identifiers. In particular, FIG. 2 shows a magazine 210 that has been turned open to show a left page 202a and a right page 202b. Left page 202a comprises one traditional static media object and right page 202b comprises a second traditional static media object. In the illustrative embodiment, magazine pages 202a and 202b are described as illustrative traditional static media objects. However, static media objects may comprise any traditional static publication, or conventional static publications such as electronic publications utilizing web pages, or any object that cannot by itself provide access to related electronic information. For instance, other types of traditional static media objects may include billboards, pamphlets, legal, medical, and other documents, or pages of a book, including the book's cover. Other types of conventional static media objects may include, but are not limited to, electronic images or text (or both) retrieved from any type of storage medium (volatile and non-volatile—RAM, DRAM, ROM, EEPROM, magnetic storage, CD-ROM, DVD-ROM, etc.) that can be displayed on display devices such as computer screens, television screens, any type of CRT devices, electronic billboards, hand held wireless devices, personal digital assistants, etc. Other conventional static media objects can include any electronic images or text (or both) provided on personal computer screen savers, images displayed on web pages, any type of multi-media application, and other like electronic or digital static media objects. The reader will appreciate that this list is intended to be illustrative rather than exhaustive and that static media objects may comprise additional types of objects.

Left page 202a comprises a plurality of objects, such a graphic object 206a and text object 208a. Likewise, right page 202b comprises a plurality of objects, including graphic object 206b and text object 208b. Left page 202a has also been imprinted with an associated unique identification tag 204a. Similarly, right page 202b has been imprinted with an associated unique identification tag 204b. As will be described in more detail below, unique identification tags 204a and 204b are utilized to create an association between the static media object, such as left page 202a, and a related interactive electronic representation of the static media object.

In the illustrative embodiment, unique identification tags 204a and 204b have been shown as a sequence of unique numbers and letters. Unique identification tags 204a and 204b may also comprises information that conveys the specific publication, region, issue, date, or page number of the associated static media object. Unique identification tags 204a and 204b may also comprise information indicating that objects shown within the static media object are eligible for special promotions or discounts. Moreover, unique identification tags 204a and 204b may be shown adjacent to a well-known logo or symbol that a reader may associate with a WWW address. Alternatively, the WWW address may be shown adjacent to the unique identification tag. As will be described in more detail below, the WWW address may be used by the reader to access the interactive electronic representation corresponding to the static media object.

Referring now to FIG. 3a, additional aspects of the present invention will be described. FIG. 3a is a display screen of a standard WWW browser application program being used to access a web site for displaying an interactive electronic representation of a corresponding traditional static media object that embodies aspects of the present invention. WWW browser 112 is a standard WWW browser, such as Microsoft Corporation's Internet Explorer or Netscape Corporation's Netscape Navigator. WWW browser 112 provides functionality for receiving and displaying HTML documents, including active server pages, executing Javascript scripts and Java applications. WWW browser 112 also provides user interface features for navigating to and between WWW sites, such as the RETAILSTREET.COM WWW site 302. The functionality and operation of WWW browser 112 is well known to those skilled in the art.

The RETAILSTREET.COM WWW site 302 embodies aspects of the present invention, and provides functionality for retrieving IERs associated with all types of static media objects, both traditional and conventional. In an embodiment of the present invention, a user visits the RETAILSTREET.COM WWW site 302 utilizing WWW browser 112. The user then provides a unique identification tag 204a corresponding to a traditional or conventional static media object in a user interface window, such as "2255-EFGH." Alternatively, the unique identification tag 204a can be automatically loaded from another web page when the user "clicks on" a conventional static media object, such as a digital image. At the RETAILSTREET.COM site, the user may also provide a member number 304 which, as described in further detail below, may be associated with a user profile and utilized to track demographic information, such as the user's browsing and purchasing habits. The user may select user interface button 308 to obtain a member number 304. The user may then be prompted for personal information, including name, address, telephone number, age, sex, buying preferences, etc., from which a user profile may be created. The user profile may then be stored in a database for retrieval at a future time when the user again visits the RETAILSTREET.COM WWW site 302. The user may then select the "GO!" user interface button 306, to submit the unique identification tag 204a and the user's optional member number 304 to the WWW server.

Referring now to FIG. 3b, WWW browser 112 is shown displaying an interactive electronic representation 310 ("IER") of corresponding traditional static media object 202a. The IER 310 is transmitted from the WWW server in response to receiving the unique identification tag 204a. The IER 310 is then displayed by the browser. In an embodiment of the present invention, the IER 310 comprises an exact reproduction of the corresponding traditional static media object 204a. Therefore, IER 310 is shown in FIG. 3b comprising a graphic object 312a corresponding to graphic object 206a in FIG. 3a, and further comprising a text object 312b corresponding to text object 208a in FIG. 3a. Although the IER 310 is described in the illustrative embodiment as comprising an exact reproduction of the corresponding static media object, it should be appreciated that the IER 310 may comprise alternate subject matter. For instance, the IER 310 may comprise an alternate representation of the static media object, may comprise only a portion of the static media object, or may comprise multimedia objects, such as sound clips or video files associated with the static media object. Other types of information that may be displayed in the IER 310 will be apparent to those skilled in the art.

Portions of the displayed IER 310, or objects within the IER 310, may be "hot-linked" to additional sources of information. Therefore, if a user selects a portion of IER 310, such as graphic object 312a, additional information regarding that portion of the IER 310 may be displayed. Such additional information may comprise additional text or graphic information regarding the selected portion, purchasing information for products displayed or identified within the selected portion, or a map to a traditional brick-and-mortar retailer selling the displayed or identified product. The user's interaction with the IER 310 in this regard may be tracked by the WWW server to compile demographic information regarding the user's browsing, purchasing, and other use habits.

In FIG. 3c, a conventional static media object is illustrated. FIG. 3c is a display screen 700 of an electronic publication. Contained within this electronic publication is a digital graphic object 702. Digital graphic object 702 depicts a person 704 wearing a hat 706 and a shirt 708. Adjacent to the digital graphic object 702 is another unique identification tag 204a. Alternatively, in another embodiment, (as illustrated in FIG. 3e), unique identification tag 204a may be a hidden value that is operatively linked to the digital graphic object 702 or screen object such that when a user "clicks on" or activates the digital graphic object 702 or other screen object, the unique identification tag 204a may be automatically passed to the RETAILSTREET.COM Internet site or other affiliated Internet sites or any Internet site utilizing technology of the present invention.

In the embodiment illustrated in FIG. 3c, if a digital graphic object 702 is "hot-linked" to another internet site, the user can "click on" the digital graphic object 702 and the browser will move to another non-interactive internet site. Typically, the other non-interactive internet site will not provide any further detailed description of all of the products or people (or both) depicted in digital graphic object 702. To find out more about the products or persons depicted in digital graphic object 702, the user can log into the RETAILSTREET.COM internet site and input the unique identification tag 204a that corresponds to the digital graphic object 702. Alternatively, in the embodiment illustrated in FIG. 3e, where the unique identification tag 204a is not displayed adjacent to the digital graphic object 702, the user can "click on" the digital graphic object 702 so that the unique identification tag 204a is automatically loaded or transferred to the RETAILSTREET.COM internet site. In the embodiment illustrated in FIG. 3c, the user can "click on" the unique identification tag 204a so that the information contained within the unique identification tag 204a is automatically loaded or transferred to the RETAILSTREET.COM internet site.

Referring now to FIG. 3d, after receiving the unique identification tag 204a, the RETAILSTREET.COM web site provides a display screen 790 containing the interactive electronic representation ("IER") 800 of the corresponding conventional static media object, specifically the digital graphic object 702 of FIG. 3c. In this exemplary embodiment, when the user moves a screen pointer 802 across digital graphic object 702, detailed product information or detailed information of a person depicted in the digital graphic object 702 corresponding to the position of the screen pointer 802 is displayed.

For example, when a user moves the screen pointer 802 across a screen region adjacent to or encompassing hat 706, detailed product text information 804 may be displayed in addition to a corresponding "child" representation or object 806 that provides an enlarged view or image of the hat 706 present in the "parent" image or interactive electronic representation 800. The corresponding "child" representation or object 806 and detailed product text information 804 can display any type of information desired by the retailer or manufacturer of the product. In the embodiment illustrated, product information 804 includes a brief description of the product ("TOP HAT"), suggested retail price ("$29.95), and a product identification code ("Product ID: 1234-abcd"). Other detailed product information is not beyond the scope of the present invention. Additionally, a sound clip 808 ("A Designer Top Hat by . . . ) can be generated by the RETAILSTREET.COM to provide more product information when the user moves the screen pointer across the hat 706.

In the exemplary embodiment illustrated in FIG. 3d, when the user moves the screen pointer 802 across the shirt 708, a corresponding "child" representation or object and product information about the shirt 708 (not shown) will be displayed. When a user moves the screen pointer 802 across the person 704 depicted in digital graphic image 702, an agent or publisher may select any type of information relative to the person that will be displayed, such as the person's name, company affiliation, celebrity status, etc.

In FIG. 3e, unique identification tag 204a may be a hidden value that is operatively linked to the digital graphic object 702 or screen object 900 such that when a user "clicks on" or activates the digital graphic object 702 or other screen object 900, the unique identification tag 204a may be automatically passed to the RETAILSTREET.COM Internet site or other affiliated Internet sites or any Internet site utilizing technology of the present invention. Screen object 900 can include a trademark associated with any of the products depicted in the digital graphic object 702 or screen object can simply be a mechanism (an on-screen button) that enables a user to access an Internet site that can provide an IER of the present invention.

Referring now to FIG. 4, a distributed computer system for implementing aspects of the present invention will be described. As discussed above with respect to FIGS. 2–3, a consumer 402 obtains a static media object 202a or 702, and retrieves a unique identification tag imprinted upon the static media object 202a or disposed adjacent to the static media object 702. Alternatively, a user can "click on" a static media object 702 and the unique identification tag 204a will be automatically forwarded to the RETAILSTREET.COM internet site. The consumer 402 utilizes computer 100, including keyboard 128 and display 126, to execute a standard WWW browser and visits the RETAILSTREET.COM WWW site. The RETAILSTREET.COM WWW site is implemented via the RETAILSTREET.COM WWW server 142.

Consumer 402 visits the RETAILSTREET.COM WWW site and provides the unique identification tag 204a associated with the static media object 202a or 702. In response to receiving the unique identification tag, WWW server 142 retrieves an IER associated with the static media object 202a from media database 420 and transmits the IER to the WWW browser executing on computer 100. Media database contains IERs and other objects that are "hot-linked" to IERs. According to an embodiment of the invention, IERs are referenced to corresponding static media objects by associating the same unique identifier with both the IER and the static media object. In this manner, the IER corresponding to a particular static media object, such as static media object 202a, may quickly and easily retrieved. Documents and other objects stored in the media database 420, including IERs, may be supplied by an external supplier 418, such as suggested retail price, product manufacturer, advertising agency, or publisher of the static media object.

Once the IER has been transmitted to computer 100 and displayed on display 126 by the WWW browser, the user may select portions of the IER. The location of the selected portion is then transmitted to the WWW server 142. In response to receiving the selected portion of the IER, the WWW browser may retrieve additional multimedia objects associated with the selected portion of the IER from the media database 420. These multimedia objects may then be transmitted the computer 100. Likewise, information regarding purchasing a product shown in the selected portion of the IER may also be retrieved and transmitted to computer 100. Such information may be "hot-linked" to the selected portion of the IER and retrieved by WWW server 142 from a product location/availability database 408. Information contained in the product location/availability database 408 may also be provided by a retailer or partner 410 of the RETAILSTREET.COM WWW site. Additionally, a map comprising directions to a retailer selling a product identified in the selected portion of the IER may also be provided by consulting map a database 412, such as a database provided by MAPQUEST.COM, MAPSONUS.COM, and other like database providers. Moreover, information for purchasing a product identified in the selected portion of the IER may also be provided.

As described above, consumer 402 may optionally provide a member number 304 along with the unique identification tag. If a consumer 402 provides a member number 304, the consumer's profile is retrieved by the WWW server 142 from the member database 404. The member database 404 comprises profiles for each of the registered members and demographic history regarding members' browsing and purchasing habits. Entries in member database 404 are created by WWW server 142 after receiving personal information from users like consumer 402. Entries in member database 404 are updated by strike tracking engine 406, which records visits to the RETAILSTREET.COM web site, product information requests, and consumer purchases. Such demographic information, and additional information as known to those skilled in the art, may also be provided to or compiled by demographic engine 414. Demographic engine 414 may provide such demographic information to report generator 416. Report generator 416, in turn, may generate reports regarding access to IERs corresponding to certain static media objects and transmit them to external suppliers 418, such as product manufacturers, advertising agencies, or publishers.

Referring now to FIG. 5, an illustrative routine 500 for displaying an interactive electronic representation of a corresponding static media object will be described. Routine 500 begins at step 504, where an interactive electronic representation of a static media object is generated and then received from an external supplier, such as an advertising agency. Routine 500 continues from step 504 to step 506 where a unique identification tag is associated with the static media object. In an illustrative embodiment of the invention, the unique identification tag is imprinted on the traditional static media object. In another embodiment, the unique identification tag can be displayed adjacent to the conventional static media object or is passed as a hidden value when a user "clicks on" or activates the conventional static media object.

Routine 500 continues from step 506 to step 508 where the IER is associated with a unique identification tag that corresponds to the IER. The IER is then stored in a media database along with its corresponding unique identification tag. Routine 500 continues from step 508 to step 510, where a menu is displayed and input is received. According to an illustrative embodiment of the invention, the menu prompts a user to provide a unique identification tag and an optional user identification number. However, in the embodiment illustrated in FIG. 3e, the unique identification tag can be automatically transferred to the RETAILSTREET.COM Internet site, or affiliated databases or web sites or both, when the user "clicks on" or activates a conventional static media object.

The menu may also prompt the user to request a user identification number. Routine 500 then continues to step 512, where a determination is made as to whether the user has provided a unique identification tag or if a unique identification tag has been received. If the user has not provided a unique identification tag or one has not been received, the routine 500 continues to step 514. If the user has provided a unique identification tag or if one has been transferred, routine 500 branches to step 522.

At step 522, a determination is made as to whether the user also provided a user identification number. This user identification number can be generated by any type of user interface device such as biometric input devices (retina scanners, fingerprint scanners, body fluid sampling devices, etc.), card readers (magnetic stripe cards, RF cards, Smart cards, etc.), or any key input device (keyboards, key pads, touchscreen displays, etc.). If the user has not provided a user identification number, the routine 500 branches to step 526. If the user has provided a user identification number, the routine 500 continues to step 524, where tracking of user demographics begins. As described above, demographics tracking may comprise recording which IERs were requested by the user, recording which portions of IERs were selected by the user, which products were contained in portions of IERs requested by the user, and the like.

Routine 500 continues from step 524 to step 526, where the IER corresponding to the unique identification tag provided by the user is located. The IER may be located in the media database according to the unique identification tag. Other methods for identifying an IER corresponding to a static media object in a media database will be apparent to those skilled in the art. From step 526, routine 500 continues to step 530, where the identified IER is displayed. In illustrative embodiment of the present invention, the IER is transmitted to a standard WWW browser for displaying. At step 532, control input is received. Control input is processed at step 534, which is described below with reference to routine 600, FIG. 6.

Routine 500 continues from step 534 to step 536 where the tracking of demographic information for the user is stopped. At step 538, the collected demographic information is transmitted to a report generator, which transforms the demographic information into a demographics report in a useable format. At step 540, the demographics report is transmitted to an external supplier. The routine 500 ends at step 542.

If, at step 512, it is determined that the user did not provide a unique identification tag, routine 500 continues to step 514, where a determination is made as to whether the user has requested a member, or user identification, number. If the user has not requested a user identification number, routine 500 branches to step 510. If the user has requested a user identification number, routine 500 continues to step 516, where the user is prompted to provide personal user information, such as name, address, telephone number, etc. Routine 500 then continues from step 516 to step 518, where a new entry in the member database is created for the user comprising the user's personal information. At step 520, the user is assigned a new user identification number corresponding to the entry in the member database, and the user identification number is displayed to the user. Routine 500 then continues to step 510.

Referring now to FIG. 6, an illustrative method for receiving and handling user input selecting portions of a displayed interactive electronic representation of a corresponding static media object will be described. Routine 600 begins at step 604, where a determination is made as to whether the user has requested to return to the main menu. If the user has requested to return to the main menu, the routine 600 branches to step 606, where it returns to step 536, FIG. 5. If, at step 604, it is determined that the user has not requested to return to the main menu, the routine 600 continues to step 608.

At step 608, a determination is made as to whether the user has selected an object within the displayed IER, or a portion of the IER. If, at step 608, it is determined that the user has not selected a portion of the IER, routine 600 continues to step 610. At step 610, a determination is made as to whether the user has indicated that they would like to exit the IER display screen. If, at step 610, it is determined that the user has not indicated that they would like to exit, routine 600 branches to step 604. If it is determined at step 610 that the user has indicated that they would like to exit, routine 600 continues to step 626, which returns to step 536, FIG. 5.

If, at step 608, it is determined that the user has selected a portion of the IER, routine 600 branches to step 612. At step 612, additional information regarding the selected portion of the IER may be displayed. As described above, additional text, graphic, or multimedia objects may be displayed comprising additional information regarding the selected portion of the IER. Routine 600 continues from step 612, to step 614, where user input is again received.

From step 614, routine 600 continues to step 616, where a determination is made as to whether the user has requested that a map be displayed providing directions to a retailer selling a product contained in the selected portion of the IER. If, at step 616, it is determined that the user has not requested a map, routine 600 continues to step 622. If it is determined at step 616 that the user has requested a map, routine 600 branches to step 618, where the location of a traditional retailer selling the product is determined. The location of such a traditional retailer may be determined based upon the zip code or other geographical information of the user and using a product availability/location database. Once the location of the traditional retailer has been determined, a map to the traditional retailer map be created by consulting a map database, as is well known to those skilled in the art. At step 620, the map to the conventional retailer is displayed to the user.

If, at step 616, it is determined that the user has not requested a map, routine 600 continues to step 622, where a determination is made as to whether the user has indicated that they would like to purchase a product shown in the selected portion of the IER on-line. If the user does not which to purchase a product on-line, routine 600 branches to step 614. If it is determined that the user desires to purchase a product on-line, routine 600 continues to step 624. At step 624, the user's on-line purchase request is processed. This may include locating an on-line retailer selling the product by consulting a product availability database, collecting credit card and delivery information, and transmitting the collected information to an on-line retailer. Demographic information regarding the on-line purchase may also be recorded in the user's member profile. Routine 600 then continues from step 624 to step 626, where it returns to step 536, FIG. 5, described above.

In view of the foregoing, it will be appreciated that the present invention provides a method and system for displaying an interactive electronic representation of a corresponding static media object. It should be understood that the foregoing relates only to specific embodiments of the present invention, and that numerous changes may be made therein without departing from the spirit and scope of the invention as defined by the following claims.

What is claimed is:

1. A method for displaying an interactive electronic representation of a corresponding static media object, comprising:

identifying a conventional static media object with a unique identification tag;

the unique identification tag appearing on the conventional static media object along with an image having at least two objects;

the unique identification tag and the image with the at least two objects represented within the image being visible to the user on the conventional static media object;

creating an association between the unique identification tag and an interactive electronic representation of the static media object, the interactive electronic representation including at least two multimedia objects;

receiving the unique identification tag and a user identification code;

displaying the interactive electronic representation of the static media object in response to receiving the unique identification tag;

receiving control input selecting one of the multimedia objects within the interactive electronic representation; and in response to the selection of the multimedia object, associating demographic information with the user identification code.

2. The method of claim 1, wherein the static media object is contained within an electronic publication, the method further comprising:

in response to an activation of the static media object, generating data corresponding to the unique identification tag; and forwarding the data to an application program providing the interactive electronic representation of the static media object.

3. A method for providing to a user an interactive electronic representation of a corresponding physical static media object, comprising:

identifying the physical static media object with a unique identification tag;

the physical static media object having an image with at least two different objects forming part of the image;

the unique identification tag appearing on the physical static media object along with the image having the at least two objects;

the unique identification tag and the image with the two different objects represented within the image being visible to the user on the physical static media object;

receiving the identification tag; and forwarding an interactive electronic representation of the physical static media object in response to receiving the unique identification tag;

the interactive electronic representation having a duplicate image of the image in the physical static media object;

the duplicate image being a reproduction of the image contained within the static media object and includes the at least two objects;

the interactive electronic representation enabling the user to obtain additional information on the at least two different objects contained within the duplicate image;

wherein the user is able to see the image and at least two different objects in the physical static media object and can obtain the additional information on the at least two different objects contained within the image of the physical static media object by receiving the interactive electronic representation.

4. The method of claim 3, further comprising:

associating the interactive electronic representation of the physical static media object with the identification tag; and retrieving the interactive electronic representation of the static media object based upon the identification tag.

5. The method of claim 4, wherein the interactive electronic representation comprises an exact reproduction of the static media object.

6. The method of claim 4, further comprising:

receiving control input selecting one object within the interactive electronic representation of the static media object as a selected object; and displaying the additional information associated with the selected object.

7. The method of claim 6, wherein the additional information comprises text information.

8. The method of claim 6, wherein the additional information comprises graphic information.

9. The method of claim 6, wherein the additional information comprises purchasing information for a product identified in the selected object of the interactive electronic representation of the static media object.

10. The method of claim 9, wherein the purchasing information comprises a map to a retailer selling the product.

11. A method for displaying to a user an interactive electronic representation of a corresponding physical static media object, comprising:

identifying the physical static media object with a unique identification tag;

the physical static media object having an image with at least two different objects forming part of the image;

the unique identification tag appearing on the physical static media object along with the image having the at least two objects;

the unique identification tag and the image with the two different objects represented within the image being visible to the user on the physical static media object;

creating an association between the unique identification tag and an interactive electronic representation of the physical static media object;

receiving the unique identification tag; and displaying an interactive electronic representation of the physical static media object in response to receiving the identification tag;

the interactive electronic representation having a duplicate image of the image in the physical static media object;

the duplicate image being a reproduction of the image contained within the static media object and includes the at least two objects;

the interactive electronic representation enabling the user to obtain additional information on the at least two different objects contained within the duplicate image;

wherein the user is able to see the image and at least two different objects in the physical static media object and can obtain the additional information on the at least two different objects contained within the image of the physical static media object by receiving the interactive electronic representation.

12. The method of claim 11, wherein the interactive electronic representation of the physical static media object comprises a plurality of objects, and further comprising:

receiving control input selecting one of the plurality of objects as a selected object; and in response to the selection of the selected object, displaying a second object associated with the selected object.

13. The method of claim 12, wherein the unique identification tag comprises a code identifying a publication containing the physical static media object.

14. The method of claim 13, wherein the code further comprises information identifying a publication date of the publication containing the physical static media object.

15. The method of claim 12, wherein the second object comprises text information.

16. The method of claim 15, wherein the second object comprises graphic information.

* * * * *